US008799599B2

(12) United States Patent
Nunez et al.

(10) Patent No.: US 8,799,599 B2
(45) Date of Patent: *Aug. 5, 2014

(54) TRANSPARENT DATA MIGRATION WITHIN A COMPUTING ENVIRONMENT

(75) Inventors: Catherine Moriarty Nunez, Tucson, AZ (US); Martine Bruce Wedlake, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/467,754

(22) Filed: May 9, 2012

(65) Prior Publication Data

US 2012/0221790 A1 Aug. 30, 2012

Related U.S. Application Data

(63) Continuation of application No. 12/846,823, filed on Jul. 29, 2010.

(51) Int. Cl.
*G06F 12/02* (2006.01)
(52) U.S. Cl.
USPC .......... 711/162; 711/114; 711/154; 711/161; 711/170; 707/782
(58) Field of Classification Search
USPC .......... 711/114, 154, 161, 162, 170; 707/782
See application file for complete search history.

(56) References Cited

U.S. PATENT DOCUMENTS

| 6,108,748 | A  | * | 8/2000  | Ofek et al. ............... 711/112 |
| 6,640,291 | B2 | * | 10/2003 | Fujibayashi et al. ......... 711/162 |
| 7,069,402 | B2 | * | 6/2006  | Coulter et al. ............ 711/162 |
| 7,263,590 | B1 |   | 8/2007  | Todd et al. |
| 7,356,679 | B1 |   | 4/2008  | Le et al. |
| 7,523,176 | B2 |   | 4/2009  | Eisenhauer et al. |
| 8,082,411 | B1 | * | 12/2011 | Seetharam et al. ........... 711/165 |
| 8,621,165 | B1 | * | 12/2013 | Sridharan et al. ............ 711/162 |
| 2006/0047906 | A1 | * | 3/2006 | Umemura .................. 711/114 |
| 2006/0248307 | A1 |   | 11/2006 | Yamamoto et al. |
| 2008/0046671 | A1 |   | 2/2008  | Sato et al. |

(Continued)

OTHER PUBLICATIONS

Preliminary Amendment dated May 9, 2012 pp. 1-6, for U.S. Appl. No. 12/846,823, filed Jul. 29, 2010 by inventors Catherine Nunez et al.

(Continued)

*Primary Examiner* — Arpan P. Savla
(74) *Attorney, Agent, or Firm* — David W. Victor; Konrad, Raynes, Davda and Victor LLP

(57) ABSTRACT

Described is a method and system for transparently migrating data between storage systems of a computing environment without disrupting realtime access to the stored data of the storage systems. Specifically, when adding a new storage system to the computing environment, realtime data write operations can be redirected to the new storage system instead of an existing storage system. During the redirection, the data stored on the existing storage system can be accessed for data operations. Concurrently, during the redirection, data stored on the existing storage system can be migrated to the new storage system. When the data migration completes and all the data, stored on the existing storage system prior to the redirection, resides on the new storage system, the new storage system can function as the primary storage system. Thus, storage capacity can increase or be replaced without disrupting data operations.

8 Claims, 6 Drawing Sheets

(56) References Cited

U.S. PATENT DOCUMENTS

| | | | |
|---|---|---|---|
| 2008/0059745 A1* | 3/2008 | Tsukada et al. | 711/165 |
| 2008/0071999 A1* | 3/2008 | Boyd et al. | 711/154 |
| 2008/0072003 A1* | 3/2008 | Vu et al. | 711/162 |
| 2008/0183989 A1 | 7/2008 | Liu | |
| 2009/0037679 A1* | 2/2009 | Kaushik et al. | 711/162 |
| 2009/0103432 A1 | 4/2009 | Trikoz et al. | |
| 2009/0177878 A1 | 7/2009 | Gao et al. | |
| 2010/0287345 A1* | 11/2010 | Cherian et al. | 711/162 |
| 2012/0030424 A1 | 2/2012 | Nunez | |

OTHER PUBLICATIONS

First Office Action dated Oct. 15, 2012, pp. 1-18, for U.S. Appl. No. 12/846,823, filed Jul. 29. 2010 by inventors Catherine M Nunez et al.

Response to First Office Action dated Dec. 14, 2012, pp. 1-10, for U.S. Appl. No. 12/846,823, filed Jul. 29, 2010 by inventors Catherine M. Nunez et al.

Final Office Action, dated Apr. 15, 2013, for U.S. Appl. No. 12/846,823, filed Jul. 29, 2010, entitled "Transparent Data Migration Within a Computing Environment", invented by Catherine Nunez et al., pp. 1-14.

Response to Final Office Action, dated Jul. 15, 2013, for U.S. Appl. No. 12/846,823, filed Jul. 29, 2010, entitled "Transparent Data Migration Within a Computing Environment", invented by Catherine Nunez et al., pp. 1-9.

Office Action, dated Oct. 7, 2013, for U.S. Appl. No. 12/846,823, filed Jul. 29, 2010, entitled "Transparent Data Migration Within a Computing Environment", invented by Catherine Nunez et al., pp. 1-17.

Response to Office Action, dated Jan. 7, 2014, for U.S. Appl. No. 12/846,823, filed Jul. 29, 2010, entitled "Transparent Data Migration Within a Computing Environment", invented by Catherine Nunez et al., pp. 1-11.

Notice of Allowance, dated Mar. 18, 2014, for U.S. Appl. No. 12/846,823, filed Jul. 29, 2010, entitled "Transparent Data Migration Within a Computing Environment", invented by Catherine Nunez et al., Total 13 pages.

\* cited by examiner

TRANSPARENT DATA MIGRATION WITHIN A COMPUTING ENVIRONMENT

CROSS-REFERENCE TO RELATED APPLICATION

This application is a continuation of U.S. patent application Ser. No. 12/846,823, filed Jul. 29, 2010, which application is incorporated herein by reference in its entirety.

TECHNICAL FIELD

The invention relates to the transparent migration of data between existing and newly added storage systems of a computing environment while permitting realtime access to all the data stored on either the existing or newly added storage systems.

BACKGROUND

Modern Information Technology (IT) organizations typically have administrators managing systems within their IT infrastructure. As part of their responsibilities, administrators of the IT infrastructure maintain the servers, routers, and applications according to the demands of the business. For example, an IT infrastructure can include computers that manipulate and store stock exchange data that must be available during trading hours. In some instances, trading hours are on a 24×7 schedule with respect to electronic stock trades. The records of these stock trades are typically stored on storage devices of the IT infrastructure.

It is inevitable that the stock trade records will eventually consume the full capacity of storage devices storing the stock trade records. One solution is to delete some records that are no longer required by the business. However, with 24×7 stock trades, this is a temporary solution because of the constant stream of data. Another solution is to add storage devices to increase storage capacity. Unfortunately, administrators adding a storage device results in taking computer systems offline in order to install the new storage device. Moreover, when offlining the storage devices, any data loss or data inaccessibility related to the offline event is unacceptable to stock traders.

Accordingly, any solution for adding storage capacity to an existing IT infrastructure should not disrupt normal business operations.

SUMMARY

Described are embodiments of an invention for transparent data migration between storage systems of a computing environment. It should be appreciated that the present invention can be implemented in numerous ways, such as a process, an apparatus, a system, a device or a method on a computer readable medium. Several inventive embodiments of the present invention are described below.

In one embodiment, the method for data migration between storage systems includes discovering a logical storage structure of an existing storage system and establishing the logical storage structure on a new storage system. The method also includes notifying a multi-pathing module to redirect the transmission of realtime data for storage on the new storage system instead of the existing storage system, such that a host transmitting the realtime data is unaware of the redirection. The method also enables the new storage system to store the redirected realtime data and initiates a migration of stored data on the existing storage system to the new storage system such that the existing storage system provides a notification when the migration completes in order to permit the host to access the new storage system as a primary storage system.

In an embodiment of a computing environment, a computing node can be coupled to a first storage system and a second storage system. The computing node includes a multi-pathing module that permits the computing node to communicate data operations to the first storage system and the second storage system via a primary communication path and a secondary communication path, respectively. The computing environment further includes a migration communication path between the first storage system and the second storage system, such that the migration communication path is utilized to transparently perform data migration between the first storage system and the second storage system while the computing node is unaware of the data migration. The data migration is enabled by discovering a logical storage structure of the existing storage system and establishing the logical storage structure on the second storage system.

Further, the embodiment of the computing environment includes notifying the multi-pathing module to redirect the transmission of realtime data for storage on the second storage system instead of the first storage system, such that the computing node transmitting the realtime data is unaware of the redirection. In addition, the computing environment permits the second storage system to store the redirected realtime data and includes the initiation of data migration of stored data on the first storage system to the second storage system, such that the first storage system provides a notification when the migration completes in order to permit the computing node to access the second storage system as a primary storage system.

In an embodiment of computer-readable media having executable instructions stored thereon for causing components of a computing environment to perform a method, the embodiment includes discovering a logical storage structure of an existing storage system and establishing the logical storage structure on a new storage system. Further, the embodiment includes notifying a multi-pathing module to redirect the transmission of realtime data for storage on the new storage system instead of the existing storage system, such that a host transmitting the realtime data is unaware of the redirection. The embodiment also includes enabling the new storage system to store the redirected realtime data, and initiating a data migration of stored data on the existing storage system to the new storage system, such that the existing storage system provides a notification when the data migration completes in order to permit the host to access the new storage system as a primary storage system.

It should be appreciated that other aspects of the invention will become apparent from the following detailed description taken in conjunction with the accompanying drawings, which illustrates by way of example, principles of the invention.

DETAILED DESCRIPTION

The following embodiments describe a method and a system for transparently migrating data between storage systems of a computing environment without disrupting realtime access to the stored data of the storage systems. Specifically, when adding a new storage system to the computing environment, realtime data write operations can be redirected to the new storage system instead of an existing storage system. During the redirection, the data stored on the existing storage system can be accessed for data operations. Concurrently during the redirection, data stored on the existing storage system can be migrated to the new storage system. When the data migration completes and all the data stored on the existing storage system prior to the redirection resides on the new storage system, the new storage system can function as the primary storage system. Thus, it is possible to replace or increase storage capacity without disrupting data operations. It will be obvious however, to one skilled in the art, that embodiments of the present invention may be practiced without some or all of these specific details. In other instances, well known process operations have not been described in detail to prevent obscuring the embodiments of the present invention described herein.

Figure 1:
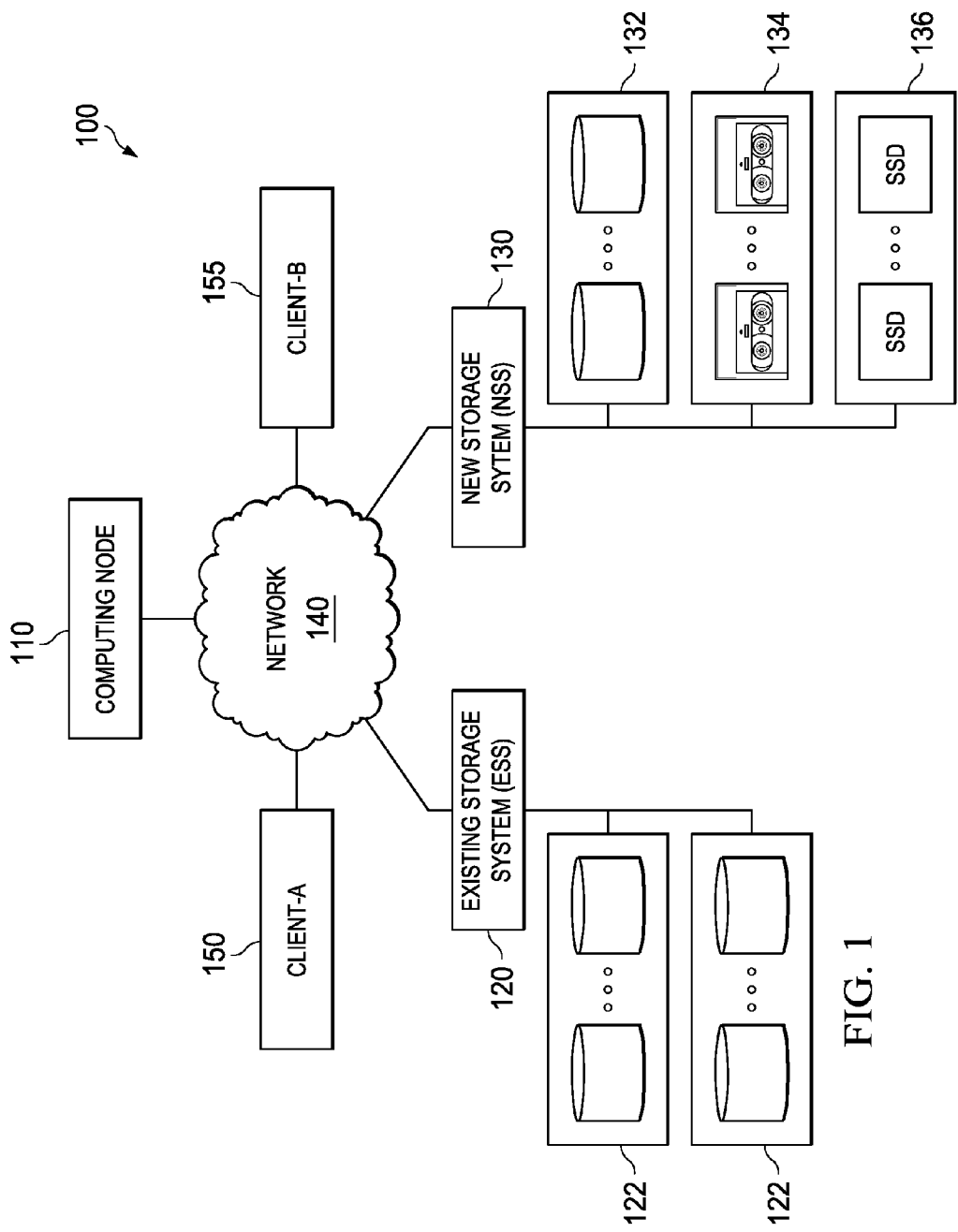
FIG. 1 is a diagram illustrating a computing environment that performs data operations in accordance with an embodiment of the invention.

Accordingly, FIG. 1 is a diagram illustrating a computing environment 100 that performs data operations in accordance with an embodiment of the invention. Specifically, the computing environment 100 includes computing devices and storage systems that permit the performance of data operations, such as read and write operations. The computing environment 100 includes multiple computing systems such as a computing node 110, an existing storage system 120, a new storage system 130, and a client-A 150 and a client-B 155. The computing systems can communicate with one another via a network 140. It should be appreciated that the computing systems can be any device capable of processing data, such as for example, a server, mainframe, personal computer, laptop, tablet device, or mobile device, which includes smartphones and the like.

A computing system, such as the computing node 110, can include components (not shown) such as at least one processor, memory, a network adapter, antenna, and local storage that are managed by an operating system. Many general or special purpose operating systems exist that manage the components of the computing system, such as Unix-type operating systems and Microsoft Windows-style operating systems. The operating systems organize data using "file systems," which are data repositories for files. In practice, the local storage can be a magnetic disk drive or solid state storage device, such as a flash memory. Further, the computing system may include a user interface, such as a keyboard, touch-screen, or pointing device that enables user input. Finally, the computing system may include a user viewable screen displaying a graphical user interface (GUI) or text-based interface, such as a Command Line Interface (CLI).

The storage systems, such as existing storage system (ESS) 120 and new storage system (NSS) 130 can also be connected to local storage devices. Such storage systems can be Network Attached Storage (NAS) systems and devices of a Storage Area Network (SAN) network. Accordingly, these storage systems are capable of performing embodiments of the present invention described herein. For simplicity, as illustrated by FIG. 1, storage devices, such as storage arrays, can include disk arrays 122/132, a tape array 134, and a solid state device array 136, any of which may be organized under a Redundant Array of Inexpensive/Independent Disks (RAID) level. The disk arrays 122/132 can include magnetic disks and optical disks. In contrast, the tape array 134 can include tapes and the solid state device array 136 can include solid state devices (SSDs). It should be appreciated that one may combine the magnetic disks, optical disks, tapes, and SSDs on a single array.

One of ordinary skill will realize that the network 140 includes any number of switches, routers, and other specialized network devices providing data transfer services between computing systems of the computing environment. Accordingly, the client-A 150 and client-B 155, can bi-directionally communicate data to and from the computing node 110. For example, the client-A 150 can include an email application (not shown) that communicates with an email database application (not shown) on the computing node 110. Email data can be processed for storage by the computing node 110 and transmitted via the network 140 to the existing storage system 120, which in turn stores the email data on the disk arrays 122.

In yet another example, the client-B 155 may request the services of the computing node 110, by exchanging data packets over the network 140. The client-B 155 may issue data packets using file-based access protocols or block-based access protocols. Such protocols are common and include the Common Internet File System (CIFS) protocol, Network File System (NFS) protocol, Transmission Control Protocol/Internet Protocol (TCP/IP), Small Computer Systems Interface (SCSI) protocol encapsulated over TCP (iSCSI) and SCSI encapsulated over Fibre Channel (FCP). It should be appreciated that any computing system may communicate with any other computing system of the computing environment in this manner.

As a further example of performing data operations, source information from the computing node 110, functioning as a host, can be organized by the host for storage on any storage device accessible by the existing storage system 120. To enable data storage on the disk arrays 122, the existing storage system 120 may represent logical representations of the physical storage devices as "volumes." In this example, the volumes, or data repositories, represent any logical combination of physical disks and can be selected by the existing storage system 120 for storing data. It should be appreciated that depending on the operating system and storage system, data may be stored and accessed as files or as blocks of file-based, block-based, or combination file-based/block-based storage systems. By enabling data operations over a computing environment such as the one illustrated on FIG. 1, the computing environment can be a distributed storage management system.

Figure 2:
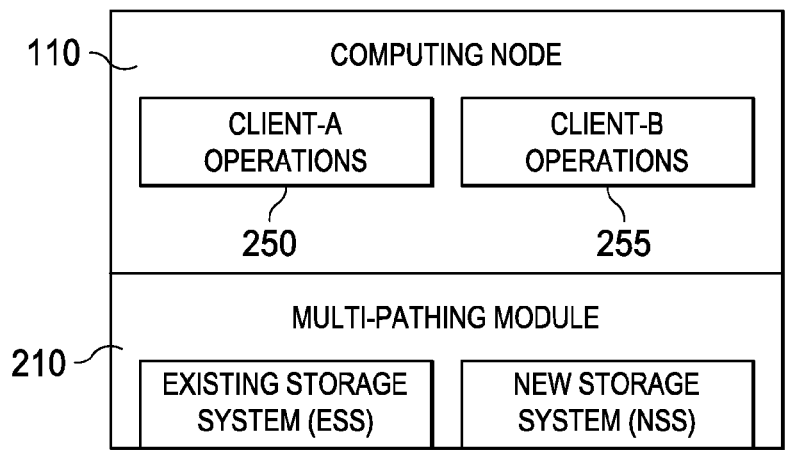
FIG. 2 is a diagram illustrating a computing node of the computing environment, in accordance with an embodiment of the invention.

FIG. 2 is a diagram illustrating a computing node 110 of the computing environment, in accordance with an embodiment of the invention. In one embodiment, the computing node 110 includes modules for processing data operations. For example, the computing node 110 can receive client-A operations 250 and client-B operations 255 from the client-A 150 and the client-B 155, respectively. These client operations can be data operations (read, write, modify, delete, etc.) that signal the computing node 110 to communicate with the storage systems. To communicate with either the existing storage system 120 or the new storage system 30, the computing node 110 includes a multi-pathing module 210. The function of the multi-pathing module 210, which can be executable software/driver in either the memory or embedded firmware, is to aid in the communication of data to any storage system in communication with the computing node 110. In one embodiment of the present invention, the multi-pathing module 210 can initially communicate with the existing storage system 120. After the addition of the new storage system 130 to the computing environment 100, the computing node 110 is configured to identify and locate the newly added storage system with the aid of a system administrator or other process. Thereafter, after an appropriate signal from a computing system of the computing environment 100, which is further described with respect to FIG. 4, the multi-pathing module 201 can switch the data path from the existing storage system 120 to the new storage system 130.

Figure 3A:
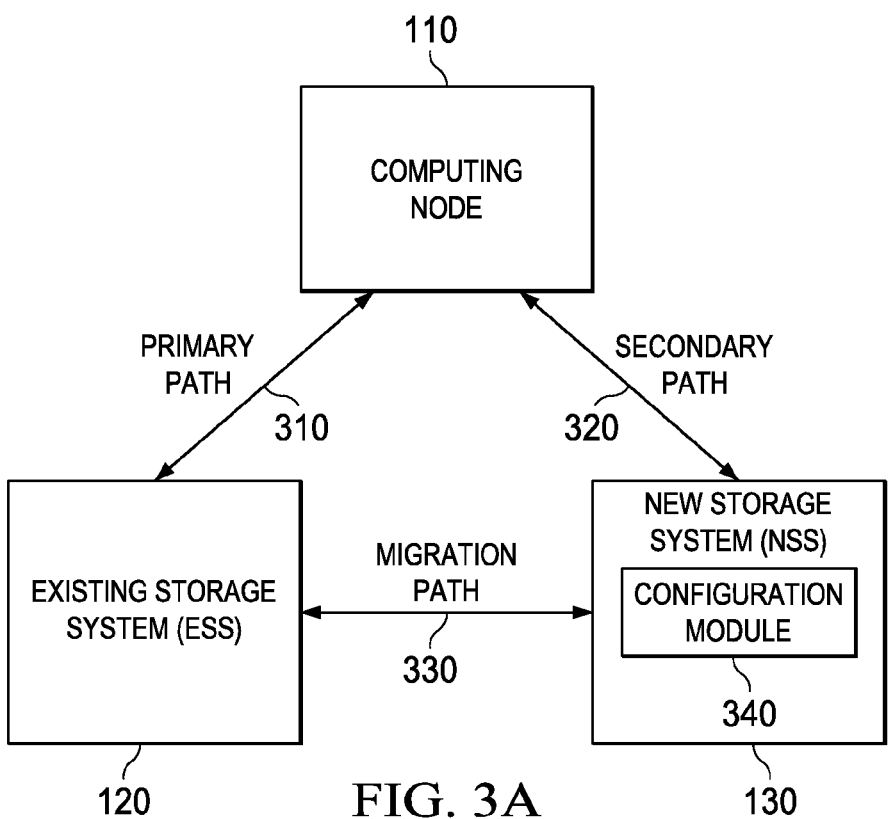
FIG. 3A is a diagram illustrating the computing node and storage systems where data reside, in accordance with an embodiment of the invention.

Specifically, FIG. 3A is a diagram illustrating the computing node 110 and storage systems, in accordance with an embodiment of the invention. Specifically, the data paths can include a primary path 310, a secondary path 320 and a migration path 330. Each data path can be any of a wired or wireless technology, implemented with various communication protocols. For example, the data path can be implemented with iSCSI over CAT5 cabling, Fibre Channel over Ethernet (FCoE), IEEE 802.11, fiber optics cable, or the like. It should be appreciated that the data paths provide bi-directional communication between all computing systems of the computing environment. In the embodiment illustrated in FIG. 3A, the primary path 310 permits communication between the computing node 110 and the existing storage system 120. This path is used initially to store data from the computing node 110 to the existing storage system 120. In contrast, the secondary path 320 permits communication between the computing node 110 and the new storage system 130, which is the data path when another storage system is added in response to the need, for example, of adding additional storage capacity. Finally, the migration path 330 between the existing storage system 120 and the new storage system 130 permits communication during the migration process of transferring data from the existing storage system 120 to the new storage system 130. It should be appreciated that the data migration process may move the data thereby maintaining only one copy of the data or may duplicate the data, which creates at least two copies of the data.

Figure 3B:
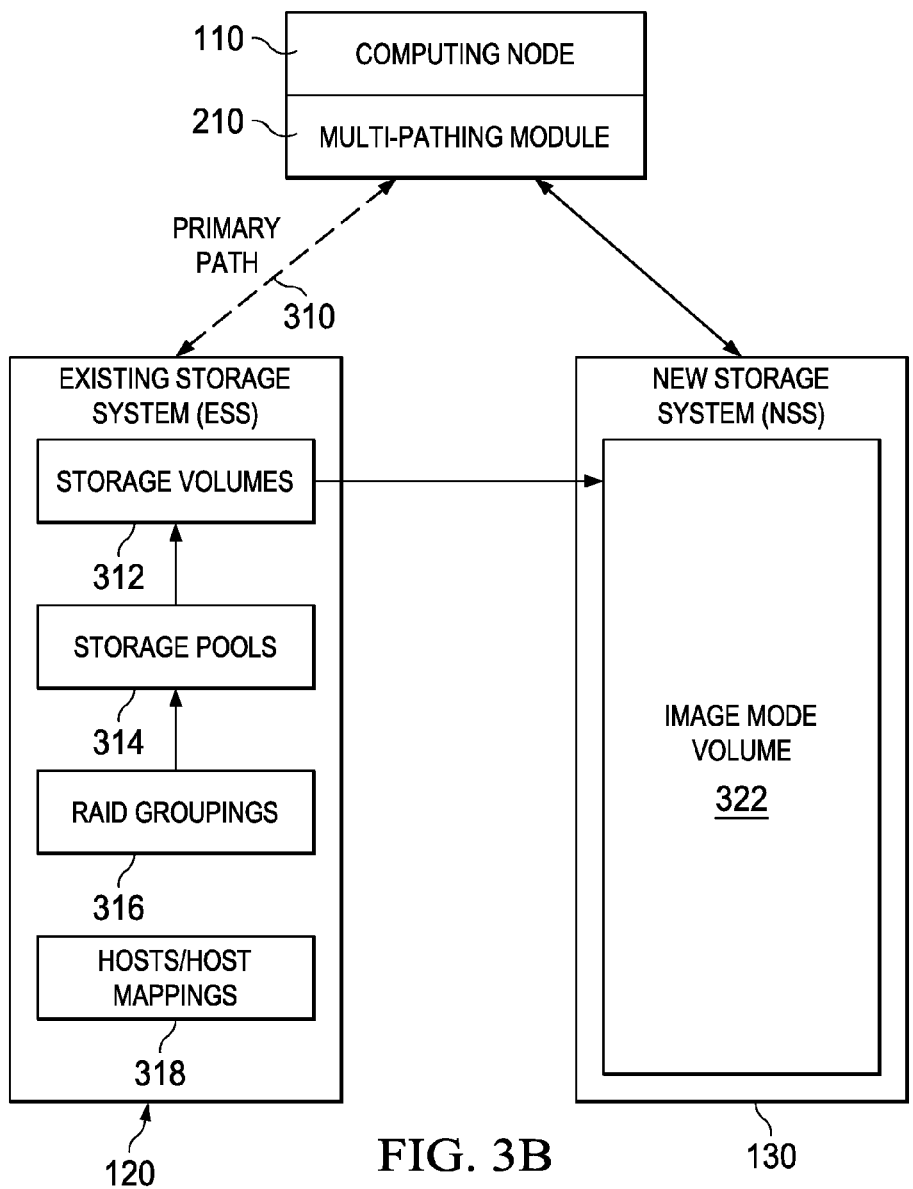
FIG. 3B is another diagram illustrating the computing node and storage systems having logical structures for storing data, in accordance with an embodiment of the invention.

The migration path 330 is also used by the new storage system 130 to identify the existing data repositories of the existing storage system 120. For example, a configuration module 340 can be implemented according to the SMI-S standard to probe the existing storage system 120 to identify the logical structures that comprise the data repositories. After identifying the logical structures, the configuration module 340 can construct new logical structures on the new storage system 120 to aid in the data migration process. For example, FIG. 3B is another diagram illustrating the computing node and storage systems having logical structures for storing data, in accordance with an embodiment of the invention. Specifically, the existing storage system 120 receives data from the computing node 110 via the primary path 310.

The received data are stored in at least one storage volume of the storage volumes 312. The storage volumes 312 are organized by storage pools 314, which are in turn, organized into RAID grouping 316. Hosts/Hosts mappings 318 identify the source of the data, such as computing node 110. It should be appreciated that the logical structures described above can be implemented in other ways by other storage systems. The description is purely an example to aid in understanding one embodiment of the present invention.

Figure 3C:
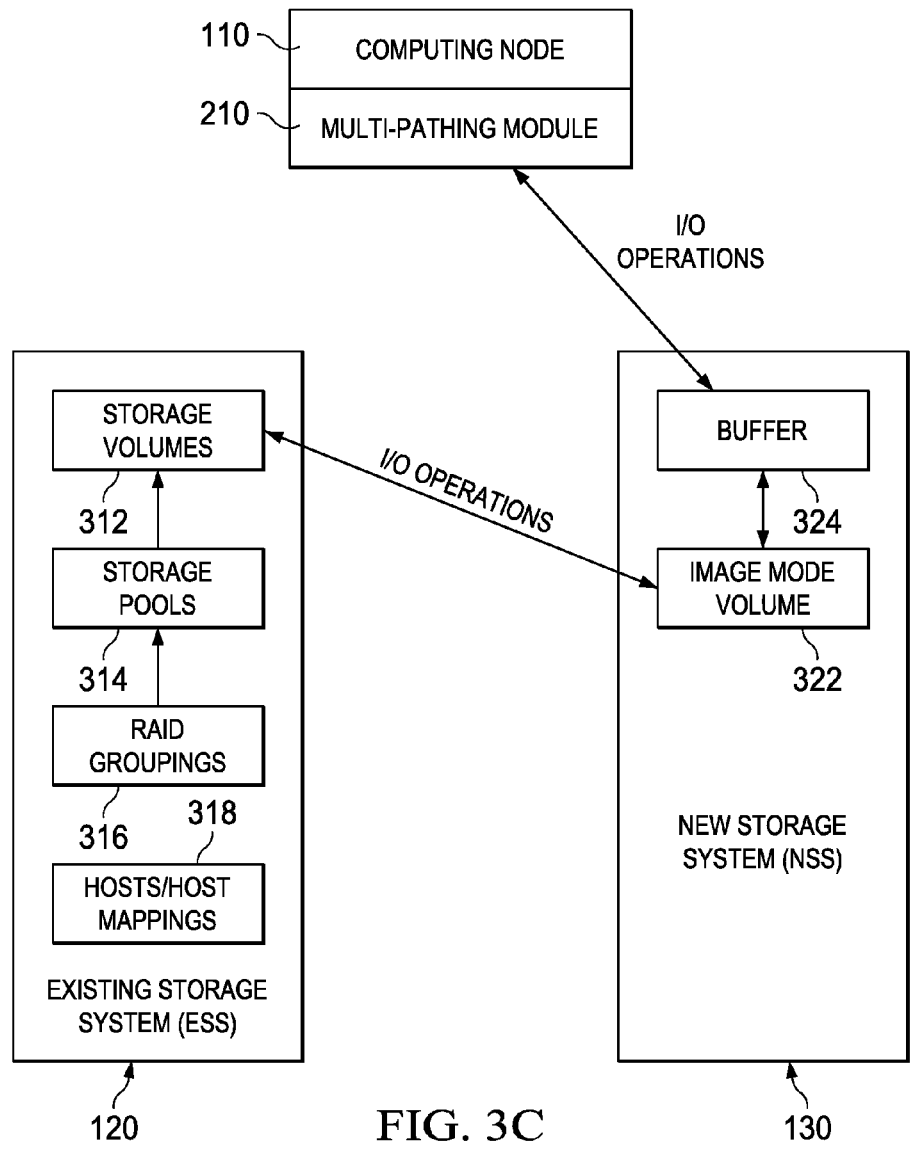
FIG. 3C is yet another diagram illustrating the computing node and storage systems with input/output (I/O) operations, in accordance with an embodiment of the invention.

As described with respect to FIG. 3A, once the configuration module 340 identifies the logical structures of the existing storage system 120, the configuration module 340 creates similar logical structures in the new storage system 130. In particular, an image mode volume 322 can be created on the new storage system 130. The image mode volume 322 includes virtual disks, managed disk groups, RAID groupings, Host ports/Hosts, and Host mappings that match the logical structures of the existing storage system 120. Further, the image mode volume 322 is a pass-through volume from the new storage system 130 to the existing storage system 120, which is further described with respect to FIG. 3C.

In one embodiment, the configuration module 340 can be manipulated by using a Graphical User Interface (GUI) wizard viewable by a user/administrator. Alternatively, a text-based interface is sufficient to implement the configuration module 340. During the image mode volume 322 creation, the configuration module 322 probes the existing storage system 120 to harvest the logical structures and consequently, can present the user/administrator with choices regarding which logical structures to create on the new storage system 130. The user/administrator can choose some or all of the logical structures. Alternatively, a default option can be presented for selection, such as for example, all identified logical structures. In yet another embodiment, the configuration module 322 may be configured as a default setting to bypass user/administrator interaction and create an image mode volume 322 on the new storage system 130 of all the logical structures of the existing storage system 120.

The pass-through process described above is illustrated in FIG. 3C, which is yet another diagram illustrating the computing node and storage systems with input/output (I/O) operations, in accordance with an embodiment of the invention. Specifically, the image mode volume 322 is a proxy to the logical structure identifiers of the existing storage system 120. The proxy operates by exposing/mirroring Logical Unit Numbers (LUNS) of the new storage system 130 storage devices to the existing storage system 120 storage devices. However, prior to the data migration, the LUNS are not physically allocated on the new storage system 130, but simply identified to permit pass-through I/O operations to the existing storage system 120.

Accordingly, when I/O operations, such as the data read operations, are requested by the computing node 110, the data request is made via the multi-pathing module 210 to the new storage system 130, passing through a buffer 324 to the image mode volume 322. Since the data is not stored in the new storage system 322, the I/O operation proceeds to the existing storage system 120, where the data resides. By passing-through the data read operation from the new storage system 130 to the existing storage system, the realtime data request can be fulfilled without the computing node 110 being aware of where the data actually resides. Moreover, the new storage system can be added to the computing environment in a non-disruptive process.

One of ordinary skill in the art can appreciate that the buffer 324 can be any memory implementation, such as cache or other tier of a hierarchical memory system. Thus, when a data read operation is satisfied for the first time during a pass-through process, the buffer 324 stores the data so that subsequent data read operations can be satisfied by the new storage system 130 from the buffer 324 instead of obtaining the data from the existing storage system 120. Accordingly, the subsequent data read operations are faster than the initial data read operation of the pass-through process. However, enabling the buffer 324 on the new storage system 130 may cause data inconsistencies when multiple I/O operations are simultaneously accessing the same LUN. For example, a data read operation satisfied from the buffer 324 may not be the correct data if a data write operation updates the data residing on the existing storage system 120. Accordingly, in some embodiments, the buffer 324 functioning as a cache can be disabled.

Figure 3D:
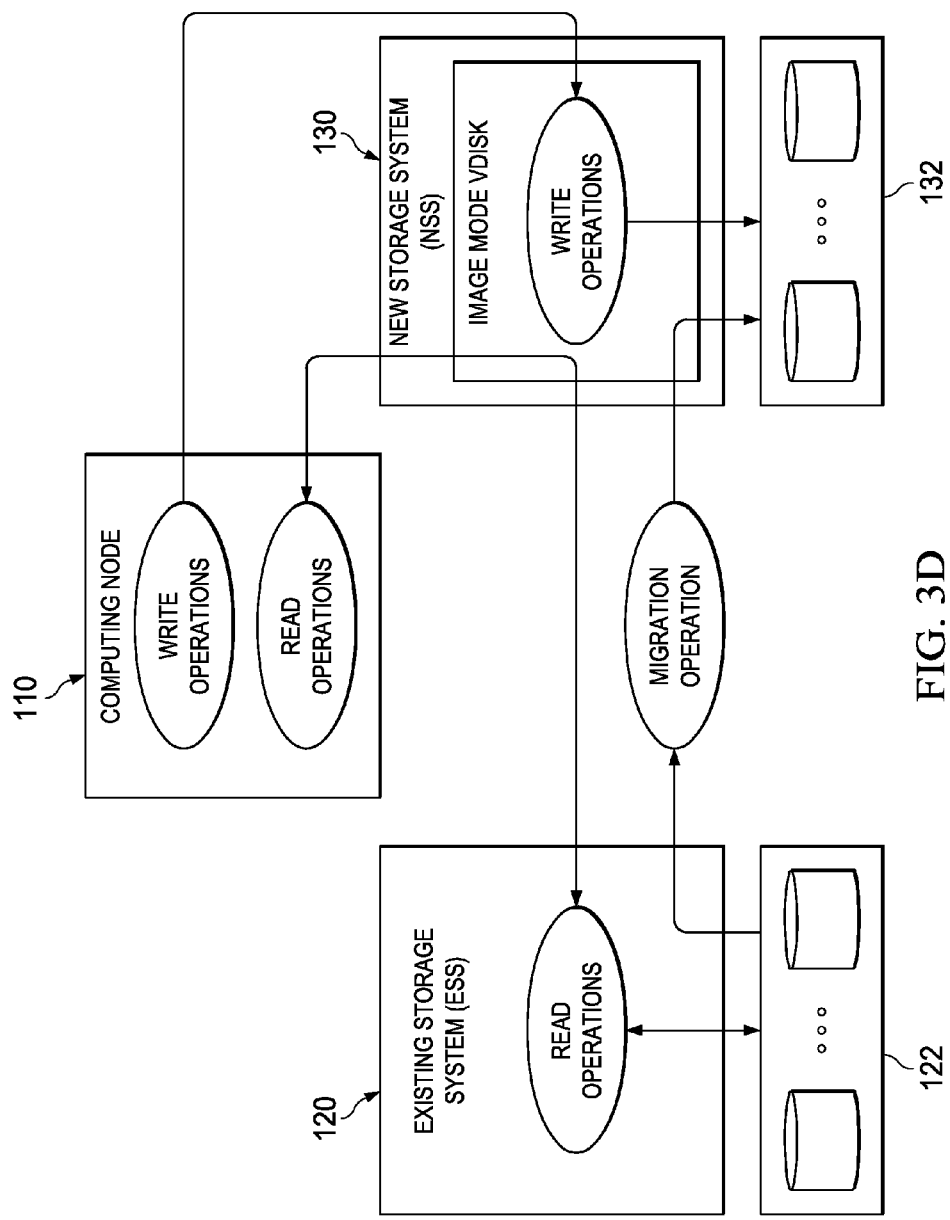
FIG. 3D is a diagram illustrating the computing node and storage systems migrating data, in accordance with an embodiment of the invention.

Now, FIG. 3D is a diagram illustrating the computing node and storage systems when migrating data, in accordance with an embodiment of the invention. Specifically, after the pass-through process has begun, the migration operation can be initiated by a user/administrator. Alternatively, the migration operation can begin automatically by being triggered by the configuration module 340, after starting the pass-through operation. In this example, the computing node 110 initiates data read and write operations that are directed to either the existing storage system 120 or the new storage system 130 during the pass-through process. When performing a data write operation, the new storage system 130 does not pass through the data, but instead uses the image mode volume, implemented as a virtual disk, to store the data in storage device 132. At this point, realtime data is written to the new storage system 130 and subsequent data read operations for the realtime data can be satisfied by the new storage system 130. However, for data that still resides on the storage device 122 managed by the existing storage system 120, the data read operation is passed through.

While these data read and write operations occur, the migration operation performs simultaneously. Specifically, data stored on the storage device 122 can be read by the existing storage system 120 and transmitted to the new storage system 130. Upon receiving the data from the existing storage system 120, the new storage system utilizes the image mode volume to store the data on the storage device 132. Thereafter, the data is said to have been migrated once all the data stored on storage device 122 also resides on the storage device 132. Alternatively, the data can be moved to storage device 132 from the storage device 122, thereby leaving the storage system 120 available for use as a new storage system. In some embodiments, however, the existing storage system 120 and/or the storage device 122 can be taken offline and no longer be used by the computing environment.

Figure 3E:
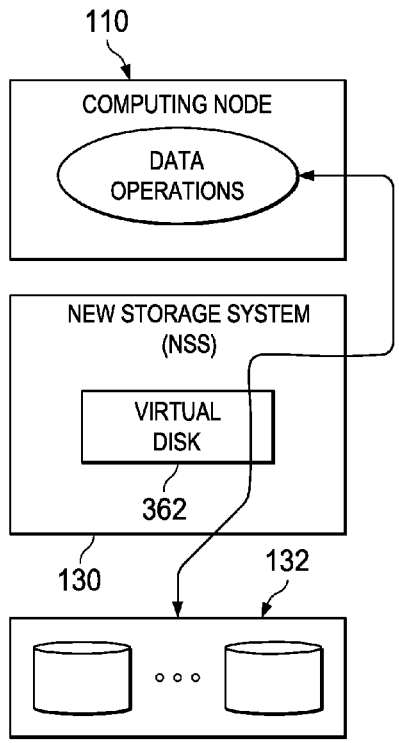
FIG. 3E is a diagram illustrating the computing node and new storage system, in accordance with an embodiment of the invention.

For example, FIG. 3E is a diagram illustrating the computing node 110 and new storage system 130, in accordance with an embodiment of the invention. After performing the data migration, the computing node 110 can initiate data operations that are directed to the new storage system 130. The new storage system 130 receives the data operations and uses a virtual disk 362, which identifies the location of data in the storage device 132. Specifically, during a read or modify operation, the data can be accessed by the new storage system 130 by locating that data stored on the storage device 132 for transmission to the computing node 110. Alternatively, during a write operation, data is written to the storage device 132 and the location information is stored in the virtual disk 362.

It should be appreciated that the virtual disk 362 is the logical storage structure identified from the existing storage system 120 (not shown) that is now offline in this embodiment of the invention. Moreover, the virtual disk 362 now functions as the primary virtual disk, instead of passing through data operations, as performed by the image mode virtual disk of FIG. 3D. In yet other embodiments, the existing storage system 120 can be reassigned for other uses such as for example, use in a hierarchical storage system, if the existing storage system 120 performs slower than the new storage system 130.

Figure 4:
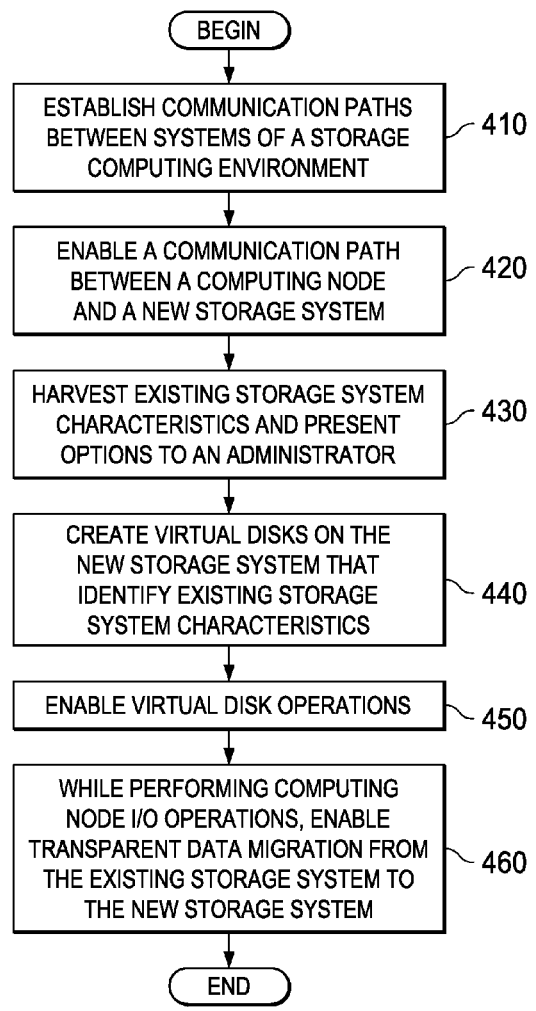
FIG. 4 is a flowchart of operations for transparently migrating data between storage systems of the computing environment, in accordance with an embodiment of the invention.

FIG. 4 is a flowchart of operations for transparently migrating data between storage systems of the computing environment, in accordance with an embodiment of the invention. For example, a first storage system can exist in the computing environment that is already in use. Further, a second storage system can be added to the computing environment to increase the storage capacity of the computing environment or to replace the first storage system. In either case, it is preferable to avoid disruptions to data operations and the unavailability or corruption of data. Accordingly, the transparent migration of data is said to be transparent to the requestor of the data operation.

In module 410, an administrator can establish communication paths to all the storage systems of the computing environment. This occurs for example, as computing devices are added to the computing environment. Thereafter in module 420, a multi-pathing process may be configured to enable a communication path between a computing node and a new storage system of the computing environment. The multi-pathing module process is a software module or embedded software of a computing node that permits network traffic originally directed to the existing/first storage system to be redirected to the new/second storage system. Examples of multi-pathing processes are embodied by IBM Basic HyperSwap™ technology, EMC Powerpath, or the like. It should be appreciated that any multi-pathing process can be implemented as long as the process permits the redirection of network traffic from one storage system to another storage system by a computing node.

In module 430, a process implemented as a software wizard of the new storage system or some other computing device of the computing environment, can initiate the process to harvest the existing storage system characteristics and present options to an administrator. The administrator can select among the presented options, which can include selecting which characteristics of the existing storage system to minor on the new storage system. Such characteristics include, for example, volume identifiers/metadata, storage pool mappings, host mappings, etc. The characteristics are the logical structures that define the LUNS, managed disk groups, RAID information that together comprise the data repositories. Some or all of the logical structures may be selected for the creation of an image mode virtual disk of the new storage system.

Thereafter, in module 440, the software wizard creates one or more virtual disks on the new storage system that identify the existing storage system characteristics, as described above. Subsequently, in module 450, the administrator can enable virtual disk operations by using the software wizard. One type of virtual disk operation is a pass-through process that permits data read/write operations that initiate at the computing node to pass-through the virtual disk of the new storage system to the existing storage system to satisfy the data read/write operation. Another type of virtual disk operation permits a pass-through of data read operations using the virtual disk of the new storage system to retrieve data from the existing storage system. While data read operations are passed through, data write operations use the virtual disk of the new storage system to store data to the storage devices of the new storage system.

Accordingly, in module 460, while performing computing node I/O operations, as described above, the software wizard can enable transparent data migration from the existing storage system to the new storage system by copying or moving data stored by the existing storage system to the new storage system. It should be appreciated that the transparent data migration occurs non-disruptively to the computing node of the computing environment. Upon completion of the data migration, which can be identified by verifying that all the data chosen for migration exists on the new storage system, the existing storage system may be removed or repurposed for other uses.

The foregoing description has been directed to particular embodiments of the invention. It will become apparent, however, that other variations and modifications may be made to the described embodiments, with the attainment of some or all of their advantages. For example, although the embodiments described herein include multiple computing systems of a distributed storage management system, one of ordinary skill in the art will realize that at least one computing device can perform all the operations described herein.

With the above embodiments in mind, it should be understood that the invention can employ various computer-implemented operations involving data stored in computer systems. These operations are those requiring physical manipulation of physical quantities. Usually, though not necessarily, these quantities take the form of electrical, magnetic, optical signals, or the like, that are capable of being stored, transferred, combined, compared, and otherwise manipulated. Any of the operations described herein that form part of the invention are useful machine operations. Additionally, the procedures, processes, and/or modules described herein may be implemented in hardware, software, embodied as a computer-readable medium having program instructions, firmware, or a combination thereof. Specifically, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), a solid state device (SSD), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc. Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for data migration between storage systems, comprising:

discovering a first logical storage structures of a first storage system wherein data is migrated from first storage devices coupled to the first storage system and stored in second storage devices coupled to a second storage system;

creating an image mode volume on the second storage system including image mode logical storage structures, including virtual disks, that match the discovered first logical storage structures, wherein the image mode volume is a proxy for the first logical storage structures of the first storage system;

notifying a multi-pathing module in a computing node to redirect the transmission of realtime data for storage on the second storage system instead of the first storage system, wherein the multi-pathing module communicates with the first storage system via a primary communication path and communicates with the second storage system via a secondary communication path;

wherein the multi-pathing module passes data read operations to the image mode volume for read data not yet migrated to the second storage system, wherein the data read operations fulfilled by the image mode volume from the first storage system, wherein the image mode volume stores read data from the first storage system on the second storage devices to complete migration of the read data; and initiating a migration of stored data on the first storage system to the second storage devices of the second storage system over a migration communication path between the first storage system and the second storage system to transparently perform data migration between the first storage system and the second storage system non-disruptively to the computing node, wherein the first storage system provides a notification when the migration completes in order to permit the host to access the second storage system as a primary storage system.

2. The method of claim 1, further comprising concurrently storing both the realtime data from the host and stored data from the first storage system on the second storage system.

3. The method of claim 1, wherein discovering the first logical storage structures of the first storage system includes probing the first storage system for at least one volume identifier and Redundant Array of Independent Disk (RAID) information.

4. The method of claim 1, wherein the passthrough of data operations occurs during a redirection of realtime data.

5. The method of claim 1, wherein the first storage system can be offlined when the migration completes.

6. The method of claim 1, further comprising:

switching communication of data operations from the first storage system to the second storage system.

7. The method of claim 1, wherein the multi-pathing module passes the read operations to the image mode volume through a buffer at the second storage system.

8. The method of claim 7, wherein the buffer stores data returned from the first storage system to the image mode volume, wherein subsequent read data operations for the data can be satisfied from the buffer.

* * * * *